Feb. 25, 1958 — A. C. SAMPIETRO — 2,824,555
FULCRUM ADJUSTER
Filed Feb. 27, 1956 — 2 Sheets-Sheet 1

Inventor
ACHILLES CHARLES SAMPIETRO

Feb. 25, 1958 — A. C. SAMPIETRO — 2,824,555
FULCRUM ADJUSTER
Filed Feb. 27, 1956 — 2 Sheets-Sheet 2
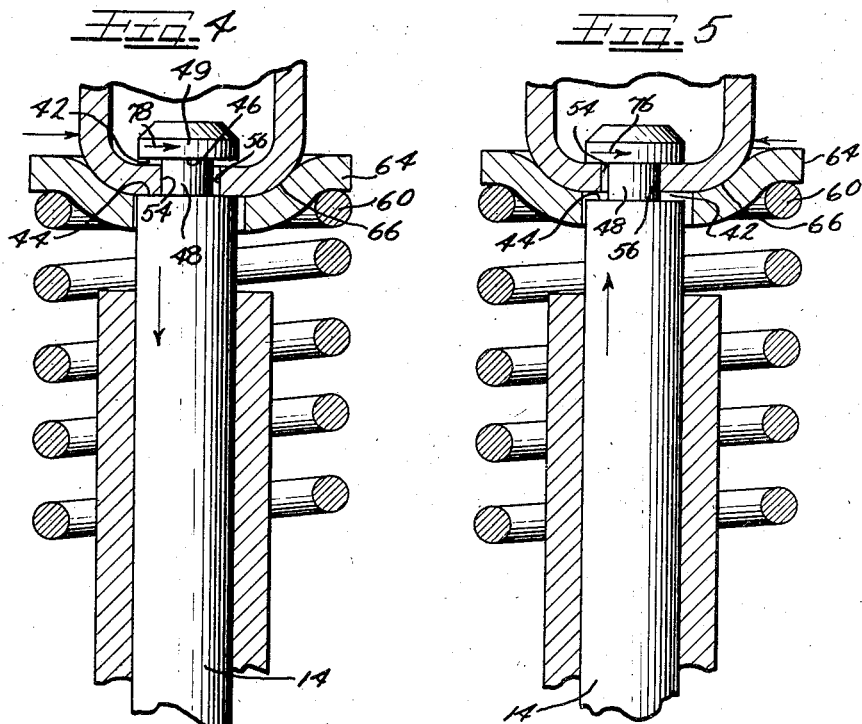
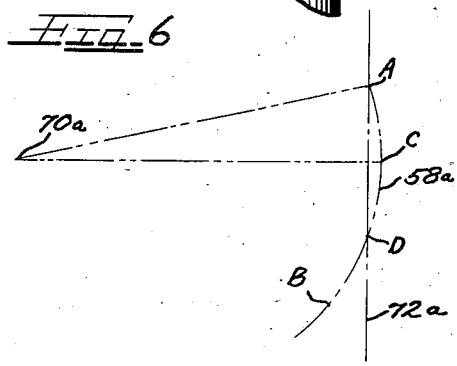
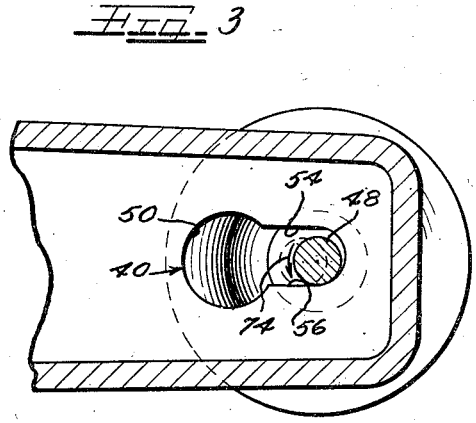
Inventor
ACHILLES CHARLES SAMPIETRO United States Patent Office 2,824,555
Patented Feb. 25, 1958

2,824,555
FULCRUM ADJUSTER

Achilles Charles Sampietro, Detroit, Mich., assignor to Thompson Products, Inc., Cleveland, Ohio, a corporation of Ohio Application February 27, 1956, Serial No. 567,767

17 Claims. (Cl. 123—90)

The present invention relates to improvements in valve operating mechanisms and more specifically to a mechanism for operating a valve of a poppet type which will automatically cause the valve to rotate during operation.

In a poppet valve, such as the type having a valve head seating in a valve opening, and being connected to a stem which is slidably mounted in a valve guide, it is well recognized that controlled rotation of the valve will greatly increase the valve's operating life. Controlled rotation will enable the valve to properly seat each time, will help prevent the valve from binding, and will reduce the chances for valve leakage.

In order to be most effective, the rotation should be in a single direction and uniform so that there will be a continual change of surfaces which face each other between the valve and the valve seat. The rotation must not be too swift or the valve will cut itself down into the seat ruining both the valve and seat. Various schemes have been employed heretofore for obtaining rotation of the valve and many of them have had disadvantages in requiring complicated mechanism which is difficult to assemble and which, in some instances, hinders the effective operation of the valve. Many devices also create too rapid rotation of the valve, especially with variance in speed of operation of the engine, thereby destroying the advantages and effectiveness of valve rotation.

It is a prime objective of the present invention to provide a valve operating mechanism which will rotate a poppet valve at a slow controlled rate during the operation of an internal combustion engine.

Another object of the invention is to provide a valve rotating mechanism which employs standard parts, and therefore does not increase the expense of producing the valve and linkage and does not increase the cost of the parts nor the time of assembly.

Another object of the invention is to produce a valve rotating mechanism which will give the valve a controlled slight amount of rotation so as to avoid the disadvantages inherent in a mechanism which rotates the valve in a rapid pace, or tends to rotate the valve rapidly at high speed engine operation.

Another object of the invention is to provide a valve operating mechanism which will rotate a valve and which will maintain ideal unvarying rotating characteristics with wear.

Another object of the invention is to provide a valve operating linkage which is capable of rotating a valve and which is readily interchangeable with engines of different designs.

Other objects and advantages will be more apparent in the following specification and claims taken in connection with the appended drawings in which:

Figure 3 is a sectional view taken along line III—III of Figure 2;

Figure 4 is a sectional view taken along line IV—IV of Figure 2, and illustrating the relative position of the parts as the valve is being pushed downwardly to open position;

Figure 5 is another sectional view similar to Figure 4 and taken along the line IV—IV of Figure 1, but illustrating the relative position of the parts as the valve is being lifted and moved to closed position; and Figure 6 is a diagrammatic showing of the path of travel of the end of the rocker arm to illustrate the principles of "scrub."

Figure 2:
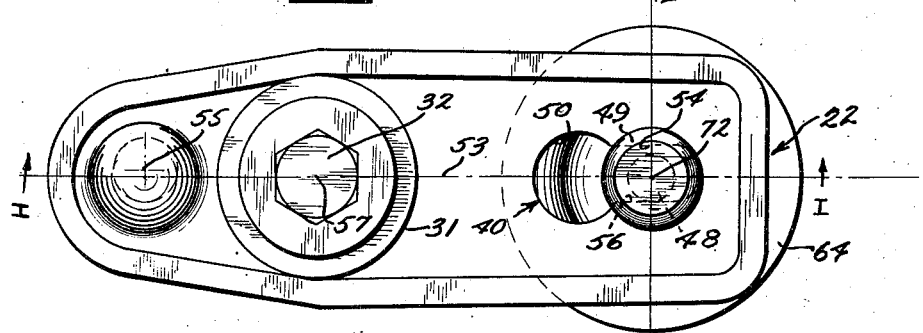
Figure 2 is a plan view of the valve operating mechanism with the view being taken from the top of the valve rocker arm.

In the preferred embodiment, as illustrated by the drawings, the valve to be operated by the mechanism is shown having a valve head 12, as illustrated in Figure 2, supported by a stem 14 which is slidably mounted for reciprocation within the valve guide 16. The valve head on the end of the valve stem moves between closed and open position to alternately move against and away from a seat 18, which is cut in the head 20 of an internal combustion engine.

For purposes of operating the valve to move it between open and closed position, a rocker arm 22 is provided. The rocker arm is formed of a section of integral sheet metal which may be stamped or otherwise shaped. The rocker arm is generally elongated and is bowl shaped having an upturned flange 24 peripherally extending around its outer edge.

To form a pivotal support for the rocker arm 22 an upstanding vertical post 26 is mounted in the engine head 20 and extends upwardly through a hole 28 in the base of the rocker arm. The hole 28 is centrally located in a spherical depressed portion 30 in the base of the rocker arm, and this depressed portion forms a bearing surface for about which the rocker arm pivots in its operation. At the upper end of the supporting post 26 is a semispherical bearing member 31 which has a bore through the center, and is thereby mounted on the post to be secured in position by a bolt 32. The semispherical bearing hollow 30 in the rocker arm pushes upwardly in sliding mating engagement with the semispherical bearing 31 during operation of the rocker arm. The rocker arm will be free to pivot about the supporting surface 31 since the hole 28 is large enough to avoid interference between the rocker arm and the post 26.

Figure 1:
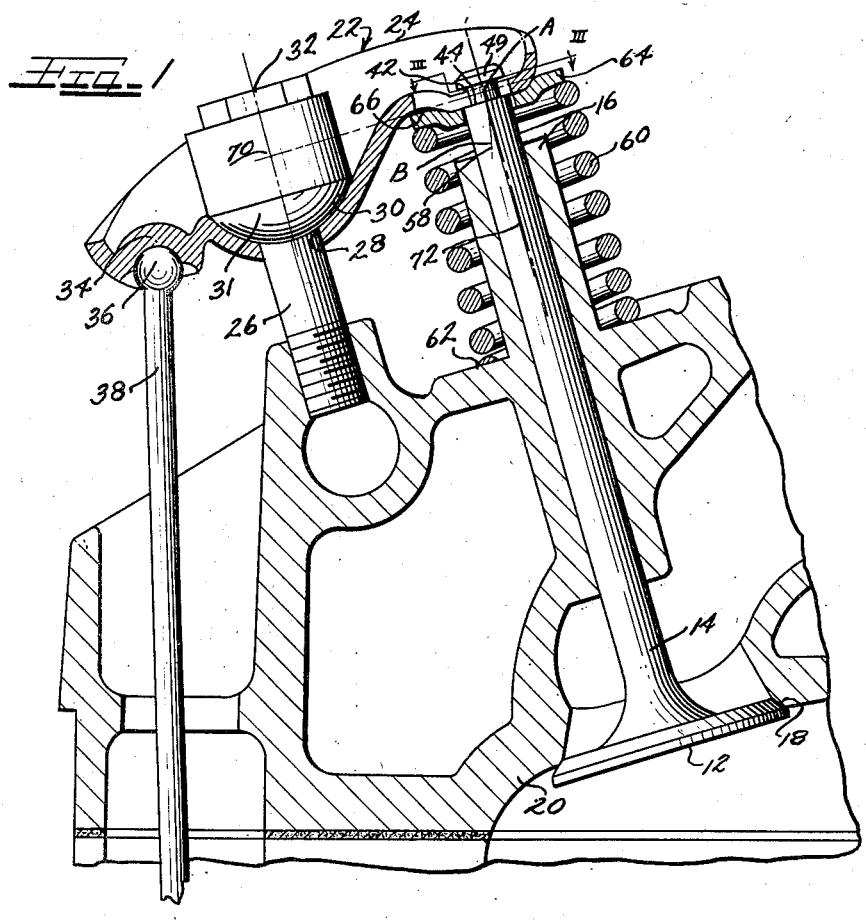
Figure 1 is an elevational view taken in vertical section along line I—I of Figure 2.

For moving the rocker arm in pivotal movement, the rocker arm and its left end, as shown in Figure 1, carries a small downwardly facing hollow 34 which receives the rounded upper end 36 of a push rod 38.

To connect the rocker arm to the valve stem so that its rocking movement will be transmitted into reciprocating movement of the valve, the base of the rocker arm 22 is provided with a key slot 40 which provides a connection to the valve stem. The valve stem, as may be viewed in Figures 1, 4 and 5, has an annular groove 42 cut in its upper end. This groove or channel is rectangular so as to form a flat wall at the sides of the groove with the shoulder or wall 44 defining the lower side of the groove, and the upper shoulder or wall 46 defining the upper side of the groove. At the base of the groove is a cylindrical portion 48 which is the reduced portion of the valve stem. The portion of the valve stem which is above the groove 42 forms a flanged cap 49 which overlies the narrow end of the key slot in the rocker arm.

Referring to Figure 2, it will be seen that the enlarged portion 50 at one end of the key slot is circular in shape and is larger than the cap 48 of the valve stem so that the rocker arm may be easily dropped over the valve stem during assembly. The rocker arm is then drawn back on the valve stem so that the narrow portion of the key slot 52 slides into the groove 42 of the valve stem. The narrow portion of the key slot has opposed side walls 54 and 56, and these side walls are spaced apart a distance slightly greater than the diameter of the groove 48 of the groove so that the rocker arm end has some small free lateral movement with respect to the valve. As will be seen by comparing Figures 4 and 5 this lateral movement permits the rocker arm to move so that one of the side walls 54 will be in direct engagement with the reduced part 48 of the valve stem. When the valve is being opened and the other side 56 will be in engagement with the stem when the valve is being closed. Since the pivotal support for the rocker arm is in the form of a semisphere, such as shown at 31 in Figure 2, this lateral movement of the end of the rocker arm in a horizontal plane will be easily permitted.

The width or height of the groove 42, as will be seen in Figures 4 and 5, is slightly larger than either the side walls 54 or 56 of the narrow portion of the key slot. This width is not critical but should be sufficiently large so as to permit the sides of the key slot to easily slide beneath the cap 49 of the valve stem, and so as to permit free movement in a horizontal direction between the valve stem and the rocker arm. Further, it will be seen that since the end of the rocker arm moves in the arcuate path, as shown by the line 58 in Figure 1, that the upper edges of the side walls 54 and 56 will slightly change their parallel relationship to the flat upper and lower walls 44 and 46 of the groove, and the groove must be sufficiently wide to permit this slight change in angular relationship.

A coil compression spring 60 is provided to urge the valve to closed position. This spring bottoms on shoulder 62 in the engine head 20 and is held at its upper edge by a retainer washer 64 which is cupped to bear against the lower curved face 66 of the rocker arm, such as shown in Figures 2 and 4. Thus, the rocker arm at one end will be urged upwardly by the coil compression spring 60 which urges it to pivot in a counter clockwise direction, as shown in Figure 1, and urges it to pivot against the upper end of the push rod 38. The action of the spring and the reactance of the push rod, of course, will cause the rocker arm itself to push upwardly in bearing engagement with the semispherical bearing member 31 which is carried by the post 26.

Thus, in assembling the unit the rocker arm is first dropped over the valve stem by passing the enlarged portion 50 of the key slot over the cap 49 of the valve. When the rocker arm has been brought down to a position opposite the groove 42 it is pulled laterally to pass the narrow portion of the key slot into the groove 42 to the position shown in Figure 2. Since the semispherical bearing member 31 is bolted to the top of the post 26, this may be left off the post until the rocker arm is dropped over the post and then the semispherical bearing member secured in place by sliding over the post and installing and tightening the bolt 32 which is threaded into the top of the post. As thus assembled, the rocker arm will be positioned over the push rod with the depression 34 in one end of the rocker arm receiving the rounded end 36 of the push rod.

It will be recognized that connecting the rocker arm to the valve stem the valve spring 60 will have to be compressed by pushing downwardly on the shaped retainer washer 64.

To operate the valve and first move it to its open position the push rod moves upwardly to rock the rocker arm in a clockwise direction, as is shown in Figure 1. When the push rod, as actuated by the engine cam shaft, again drops, the spring 60 will cause the rocker arm to follow thus lifting the valve to closed position.

During operation of the engine, the rocker arm 22 pivots about a horizontal axis which is shown at the point numbered 70. The location of this point in elevation with respect to the point of connection between the rocker arm and the valve stem is important. The center of the point of connection between the rocker arm and the valve stem is at the point marked "A" in the drawings.

The axial center of the valve stem is at 72 and this is the path of movement of the valve stem as the valve moves between open and closed position. Assuming this axis to be vertical, for the purposes of discussion only, it will be seen that if the pivotal axis 70 of the rocker arm is positioned directly opposite or in the same horizontal plane as the point "A," that as the rocker arm moves down, its contact point "A" will follow the arc 58 moving between the points "A" and "B" of Figure 1. While following this path, the stem follows a straight line along the valve axis 72 and the distance between the rocker arm axis 70 and the axis 72 of the valve stem will increase. Thus, there will have to be some sliding relationship between the rocker arm and the valve stem. This sliding relationship will be called "scrub" and achieves its name from the scrubbing action between the inner surface of the key slot of the rocker arm and the side of the valve stem.

The scrubbing action, or the relative movement between the end of the rocker arm and valve stem will, in the arrangement shown in Figure 1, be one direction while the valve is being pushed open and the rocker arm is moving from point "A" to point "B," and in the other direction when the valve is being closed. That is, the frictional sliding movement between the side walls 54 and 56 of the key slot and base 42 of the groove of the valve stem will be all in the same direction when the valve is being opened and will be in the opposite direction when the valve is being closed.

With reference to Figure 6, it will be seen that the scrubbing action being in the same direction does not always hold true. If, for example, as illustrated in Figure 6, and axis 70A of the rocker arm is positioned below the horizontal plane of the connection A between the rocker arm and valve stem when the valve is in closed position, then while the valve is being pushed down and the rocker arm moves from point "A" to point "C" the relative movement between the rocker arm and valve stem or the scrubbing is in one direction. When the rocker arm moves from point "C" to point "D" and on to point "B" the scrubbing is in the opposite direction. The scrubbing in the reverse direction from "C" to "D," equals the scrubbing in the first direction, from "A" to "C," and therefore these cancel each other. The scrub from "D" to "B" however, is a positive scrub, and is not cancelled. The net amount of scrubbing in one direction, therefore, is the difference between the lengths of the arcuate lines A—C and C—B. If the pivotal axis 70A of the rocker arm is dropped relative to the valve stem to a position so that the point "C" is so dropped that the length of line A—C is equal to line C—B, then the amount of scrubbing in the first half of the travel of the valve will exactly equal the scrubbing in the opposite direction in the second half of the travel of the valve. Thus, by design of the position of the rocker arm axis the amount of positive scrub can be determined.

As will be seen in the following description, it is important that the scrubbing be kept positive, i. e., that there be more scrubbing in one direction than the other as the valve is moved between its two positions. By placing the axis of the rocker arm in the plane which extends at right angles to the valve axis, and passes through the point of connection between the rocker arm and valve stem when the valve is either fully closed or fully open, the maximum amount of scrub will be obtained. If the axis is located in any plane between these two, the scrub will be reduced and if located exactly half way between the two, the net scrub will be zero and the scrub in one direction will equal the scrub in the opposite direction as the valve travels between its extreme positions.

If the rocker arm touches both sides of the valve stem equally or with equal pressure during the travel of the valve stem, the scrubbing action will have no tendency to rotate the valve. In the present invention, by geometrical design, such as by misalignment of parts, the rocker arm contacts one side of the valve stem while the valve is opening and the other side of the valve stem while the valve is closing. The semispherical support 31 for the rocker arm readily permits this lateral movement of the rocker arm and the coil spring 60 will not prevent this movement.

As an example of structure which will cause the rocker arm to contact alternate sides of the valve stem during different directions of motion, one of the pressure points on the rocker arm may be offset from the vertical plane of action of the rocker arm, as indicated by line 53 in Figure 2. For example, the center line of the push rod, as shown at 55, may be located at one side of the plane of action 53. As an alternate plane the axial center 57 of the semispherical bearing support 31 or the center 72 of the valve may be offset from the plane 53. These will cause the rocker arm to have a lateral thrust against one side of the valve stem when the valve is opening, and against the other side when the valve is closing, when the engine is running at high speeds.

Thus, the rocker arm will functionally engage the valve stem at a point displaced from the axial center of the valve, thereby creating a torque which tends to rotate the valve. As the valve is moved from closed to open position, or moved from position "A" to "B" in Figure 1, there is a sliding movement between the side wall 54 of the key slot in the rocker arm and the base 48 of the valve groove, this tending to rotate the valve. That is, there is a frictional sliding force acting on the surface of the valve stem at a point spaced from the central axis of the valve and this frictional force tangential to the valve will tend to rotate it. The contact between the valve stem 48 and side wall 54 of the key slot acting as the valve is open, as shown in Figure 4.

With reference to Figure 3, as the valve moves from open to closed position, or from position "B" to "A," the rocker arm will slide relative to the valve stem being in contact with the other side of the valve stem, as is shown in Figure 5. As the valve is lifted from open to closed position, the valve stem 48 slides relative to the side wall from the solid line position to the dotted line position, causing it to rotate in the direction of the arrow 74 in Figure 3 and the arrow 76 in Figure 5. During this period of movement the valve stem 48 has been in sliding engagement with the side wall 56 of the valve stem, and has been spaced from the side wall 54.

As the valve is moved from the closed to the open position, or from "B" to "A," the key slot 40 will slide relative to the valve stem in the opposite direction, and will be in contact with the other side of the valve stem 48, as is shown in Figure 4, thus causing the stem to rotate in the same direction as indicated by the arrow 78.

It will be recognized that the force applied to the valve stem which is tangential to the stem is dependent solely upon friction and the frictional force is directly proportional to the pressure between the two surfaces. The pressure between the two surfaces, i. e., the side wall 54 or 56 and the valve stem 48 is dependent upon the design of the linkage. The turning force on the valve is also dependent upon the diameter of the reduced portion or base 48 of the groove in the valve stem, with a larger diameter the torque arm will be greater and the rotation will be greater also. This is somewhat offset by the fact that the scrubbing or relative frictional movement between the rocker arm and valve stem is tangential to the surface of the stem, and when the diameter of the stem is reduced the circumference is likewise reduced and the number of degrees of rotation will increase for each unit length of slide or scrub of the rocker arm that is transmitted to the valve stem.

In any event, it will be seen that the amount of rotation can be controlled by the various factors of design, the pressure between the valve stem and rocker arm, the diameter of the stem at the point of control with the rocker arm, and the amount of net scrub as determined by the location of the pivotal axis of the rocker arm. It will be seen that the rocker arm as designed may be used interchangeably on various engine assemblies, and it is adaptable to readily change with the changes of these design factors.

It will be seen from the drawing of Figures 4 and 5 that the upper and lower surface of the rocker arm also bear against the upper and lower surfaces of the groove in the valve stem. There is relative movements between these horizontal surfaces as well as between the vertical surfaces. The rotating effect on the valve caused by these surfaces is substantially multiplied, however, since frictional force on the bottom of the valve slot, as shown in Figure 4 for example, is on both sides of the valve axis. There may be a slightly larger amount of surface contact on the left side, as shown in Figure 5, than on the right, due to the positional shift of the rocker arm, and this will aid the scrubbing rotating effect of the wall 54 against the base 48 of the slot.

In summary, the operation of the valve operating mechanism operates to obtain limited rotation of the valve as it is opened and closed as the push rod 38 raises, it pivots the rocker arm 22 about its semispherical mount 31. This pushes down on the lower shoulder 44 of the slot 42 in the valve stem 14. The rocker arm has a key slot 40 with a narrowed portion in which the reduced portion 48 of the valve stem resides. As the valve stem is pushed downwardly the end of the rocker arm swings so that the side wall 54 of the key slot rubs against the base 48 of the slot in the valve stem, Figure 4. While the rocker arm is pushing the valve open, it is following the arcuate path 58, shown in Figure 1. The valve stem is following a straight path, as defined by its axis 72, and this relative motion between the rocker arm and valve stem causes a scrubbing action. The scrubbing or functional engagement occurs at a point spaced from the axis of the valve and therefore the valve tends to rotate in the direction of the arrow 78, shown in Figure 4.

When the valve is returned to closed position, the push rod 38 drops and the spring 60 returns the rocker arm to lift the valve to closed position. When the rocker arm begins to pivot in the return direction, it swings so that the side wall 56 of the key slot engages the base 48 of the valve stem slot. The frictional scrubbing action between the wall 56 and the base 48 creates a torque on the valve stem rotating the valve in the same direction indicated by the arrow 76 as it was rotated during opening.

Thus, it will be seen that I have provided a novel means of obtaining automatic rotation of a valve during engine operation. The structural features illustrated in the preferred embodiment obtain a scrubbing action between the valve stem and the rocker arm. The structure causes a lateral frictional force between the surface of the valve stem and the rocker arm. This frictional force is applied to the valve at a location spaced from the axis of the valve so that it will apply a torque thereto to create valve rotation. Further, the structural features apply the force so that it changes sides with respect to the valve stem as the direction of the valve changes.

Thus, it will be seen that I have provided a simple valve rotational linkage which meets the objectives herein before set forth, and which is exceedingly effective. The mechanism, as will be noted from the drawings, is rugged in construction and does not require adjustment during use. Further, as wear appears in the various elements of the linkage, the principles of operation do not change and even with considerable wear the function of the apparatus will remain constant.

I have, in the drawings and specification, presented a detailed disclosure of the preferred embodiment of my invention, but it is to be understood that I do not intend to limit the invention to the specific form disclosed but intend to cover all modifications, changes and alternative constructions and methods falling within the scope of the principles taught by my invention.

I claim as my invention:

1. A valve operating mechanism comprising a poppet valve having a valve stem mounted for axial sliding movement, a rocker arm mounted for pivotal movement, a pivotal mounting for the rocker arm positioned so that there will be a net positive scrubbing action between the end of the rocker arm and the valve stem, a circumferential groove cut in the upper end of the valve stem, an elongated slot in the rocker arm cooperatively positioned to connect to the valve, the elongated slot extending in the direction of the plane of movement of the rocker arm, said slot being sufficiently wide so that only one side of the slot will engage the surface of the valve in the base of said groove, a push rod for moving the rocker arm in pivotal movement, means for causing a lateral pressure between the rocker arm and the valve stem, and means for changing the lateral pressure when the valve is moving in one direction from when the valve is moving in the other direction to cause a rotation of the valve in one direction as the surface of said slot slides in the base of the groove in the valve stem.

2. A valve operating mechanism comprising a poppet valve having a stem slidably mounted for axial reciprocation to move the valve between open and closed position, a pivotal rocker arm connected to the valve stem to move the valve, a pivotal support for the rocker arm positioned to cause a positive scrubbing action between the end of the rocker arm and the valve stem, means to connect the rocker arm to the valve stem to transmit positive movement in an axial direction with one lateral surface of the rocker arm in sliding engagement with a peripheral surface of the valve stem, and a push rod engaging the opposite end of the rocker arm and positioned out of the plane of movement of the rocker arm, said push rod causing a pressure between the engaging surfaces of the rocker arm and valve stem so that there will be a frictional engagement therebetween, the frictional engagement changing to the opposite side of the valve stem when the valve is moving in the opposite direction so as to change the lateral force exerted on the valve and to cause the valve to rotate in one direction.

3. A valve operating mechanism for a poppet valve having a head and a stem slidably mounted in a valve guide comprising means for applying a first axial force at a location on the valve stem moving the valve axially in an opening direction, means for subsequently applying a force at a location on the valve stem moving the valve in a closing direction, and means for applying a separate lateral force to the valve stem during one of its directions of axial movement lateral to the direction of movement at a location spaced from the axial center of the valve and at a location different than said first and second locations to cause a rotation thereof.

4. A valve operating mechanism for a poppet valve slidably mounted in a valve guide in an engine head comprising means operatively associated with the valve for moving the valve in an opening direction, means operatively associated with the valve to move the valve in a closing direction, rotational means applying force to the valve in a direction lateral to its axial movement when opening or closing, said force being applied at a point spaced from the axis of the valve and being applied in a direction lateral to the axial movement of the valve and being applied in a first direction when the valve is moving to opening position and being applied in the same direction but a different location when the valve is being moved to closed position.

5. Mechanism for operating a valve of a poppet type which is slidably mounted for axial movement between an open and closed position, the mechanism comprising means operatively associated with the valve to move it to open position, second means operatively associated with the valve to move it to closed position, rotational means operatively associated with the valve and adapted to apply a first force to the valve in a direction lateral of its axial path of movement and at a location spaced from the axis of the valve, said first force being applied when the valve is moving in one direction between the closed and open position, said rotational means applying a second force to the valve on the other side of the valve at a location spaced from the axial center of the valve and in a lateral direction opposite the first force to tend to rotate the valve in the same direction, said forces being substantially equal causing the valve to rotate at a substantially uniform speed.

6. A valve operating mechanism for a poppet valve slidably mounted in the valve guide comprising a valve operating member connected to the valve stem and adapted to move the valve in a first direction to open position and to move the valve in a second direction to the return closed position, and valve rotation means operatively associated with the valve stem and adapted to apply a force to the stem at a location spaced from the axial center of the valve so as to cause a rotational effect, said rotational means applying a first force in a direction lateral of the movement of the valve when the valve is moving to open position, said rotational means applying a second force lateral to the valve in the opposite direction when the valve is moving to closed position and at a point spaced from the point of application of the first force to cause the valve to rotate in the same direction.

7. A valve operating mechanism for opening and closing a valve of the poppet type having a stem slidably mounted in an engine head, the mechanism comprising a valve operating member operatively connected to the valve and adapted to move the valve to an open position and back to a closed position, and means for applying a force to the valve lateral to its path of movement between the open and closed position, said force being applied at a predetermined distance from the axial center of the valve, said force being applied in a first lateral direction when the valve is moving to open position and in a second lateral direction opposite to the first when the valve is moving in the opposite direction, said lateral direction being in the same direction tangential to the axis of the valve to cause the valve to rotate in the same direction.

8. A valve operating mechanism where a valve of the poppet type is mounted for reciprocation between an open and closed position, the mechanism comprising an operating member connected to the valve stem and adapted to move the valve between the open and closed position, and a rotational force applying means operatively associated with the valve and applying the force tangential to the axis of the valve and spaced from said axis, said force being applied in a first direction lateral to the valve for a first portion of the valve travel between closed and open position and being applied in a second opposite direction for a second portion of the valve travel from closed to open position, one of said portions of travel being longer than the other so that the valve will rotate predominately in one direction.

9. A valve mechanism comprising a poppet valve mounted for movement between a closed and an open position, an operating member connected to the valve assembly at a location spaced from the axis of the valve, said operating member being positioned to apply a frictional force in a direction at right angles to the valve axis and to apply a positive force in a direction parallel to the valve axis, said operating member having movement in a direction parallel to the valve axis and in a direction lateral of the valve axis, said directions changing when the valve changes direction of travel, means for moving the operating member at relatively high speeds to carry the valve between its open and closed position, and means for changing the point of connection between the operating member and the valve from one side of the valve to the other when the valve reverses direction to cause rotation of the valve in a single direction.

10. A valve mechanism comprising a poppet valve mounted for movement between a closed and open position, a valve operating member connected to the valve to transmit positive movements thereto the direction parallel to the valve axis and in frictional engagement therewith in a direction lateral of the valve axis, the point of frictional engagement being spaced from the valve axis, pivotal means supporting the valve operating member, power means in engagement with the valve member for pivoting the valve member and valve between open and closed position, spring means resisting movement of the valve operating member in the direction of the valve opening, said spring means biasing the valve operating member toward the direction of valve closing, one of said means engaging the valve operating member at a location out of the plane of movement of the member to cause the operating member to apply a lateral force to the valve which changes directions with reversal of the valve travel to thereby rotate the valve in one direction during operation.

11. A valve operating mechanism including a poppet valve having a stem mounted for substantially vertical reciprocation in a valve guide, a valve rocker arm mounted for pivotal movement about an axis below the horizontal plane in which the point of engagement between the rocker arm and valve stem lies, push rod means engaging the rocker arm at a point opposite the point of engagement with the valve stem and applying a force to the rocker arm to cause it to pivot and apply a force to the valve stem, a valve return spring operatively engaging the rocker arm, said rocker arm connected to the valve stem for positive transmission of movement in a direction parallel to the valve axis and frictionally engaging the valve stem for sliding movement relative thereto at a point spaced from the valve stem axis, the frictional movement between the rocker arm and valve stem creating a frictional force therebetween tending to rotate the valve with the frictional force, and means to cause the frictional engagement to move to the opposite side of the valve stem when the rocker arm pivots in the reverse direction to rotate the valve in a single direction.

12. Apparatus for operating a valve comprising a valve having a valve stem mounted for sliding reciprocating motion between a closed and an open position, valve operating means connected to the valve and adapted for movement between said open and closed positions, and valve rotation means frictionally engaging the valve stem at a point remote from the valve axis and having movement relative to the valve stem in the direction tangential to the valve axis in a first direction when the valve is moving from closed to open position and having movement tangential to the valve stem axis in a direction the same as the first direction when the valve is moving from open to closed position.

13. A valve operating mechanism comprising a poppet valve having a guide stem mounted for vertical movement between a closed and an open position in a valve guide, a rocker arm having one end connected to the end of the valve stem, means to move the rocker arm in pivotal movement to move the valve between an open and closed position, means to support the rocker arm for pivotal movement, means to connect one end of the rocker arm to the valve for positive transmission of motion in a direction parallel to the valve stem and for sliding engagement in a direction lateral of the valve stem axis, the sliding engagement being at a point spaced from the axis of the valve stem, said rocker arm being mounted so that there will be a scrubbing action between the surfaces of sliding engagement as the valve moves up and down, and means to cause a similar amount of slippage between the surfaces of engagement of the valve and rocker arm when the valve is moving in each direction moving in the other direction to cause a uniform rotation of the valve in one direction.

14. A mechanism for operating a valve comprising a poppet valve being a stem mounted for lateral reciprocation, a peripheral groove cut in the upper end of the stem for connecting valve operating means thereto, a rocker arm, a pivotal mounting for rocker arm permitting pivotal movement of the rocker arm about a vertical as well as a horizontal axis and positioned with respect to the valve stem so that the end of the rocker arm will have a positive scrubbing action relative to the stem, a slot cut in the end of the rocker arm elongated in the plane of operating movement of the rocker arm and having a width greater than the thickness of the valve stem at the base of the peripheral groove so that the rocker arm may move laterally with either side of the slot contacting the valve stem, a push rod engaging the rocker arm to operatively pivot the arm, spring means connected to urge the rocker arm toward a closed position of the valve, and means causing a change in lateral forces on the rocker arm when it changes pivotal direction to cause a frictional lateral scrubbing between the rocker arm and valve stem to rotate the stem in the same direction.

15. A mechanism for operating a valve comprising a rocker arm, a support for the rocker arm permitting pivotal movement in an operating plane and permitting limited movement in a plane perpendicular thereto, a slot in one end of the rocker arm cradling the valve stem therebetween but being wider than the stem, means on the valve to transmit positive movements between the rocker arm and valve in a direction axial of the valve, the pivotal support positioned to cause positive scrub between the valve and slot, and means to cause the valve stem to be positioned on one side of the slot when the valve is being closed and on the other side when the valve is being opened, the scrub causing the valve to rotate during operation.

16. The method of rotating a poppet valve comprising moving the valve between open and closed position, applying a tangential force to the valve at a point spaced from the valve axis when the valve is moving toward open position, and applying a tangential force to the valve at a point spaced from the valve axis when the valve is moving toward closed position.

17. The method of rotating a poppet valve about its axis comprising moving the valve axially between open and closed position, applying a first tangential force to one side of the valve stem at a point spaced from the valve axis while the valve is opening, and applying a second tangential force to the valve stem at a point diametrically opposite the application of the first force and in the same tangential direction with respect to the valve while the valve is closing to cause the valve to rotate during operation.

References Cited in the file of this patent

UNITED STATES PATENTS

| 2,641,236 | Mansfield | June 9, 1953 |

FOREIGN PATENTS

| 688,236 | Great Britain | Mar. 11, 1953 |
| 562,884 | France | Nov. 21, 1923 |
| 880,483 | France | Jan. 4, 1943 |